United States Patent [19]

Hermann

[11] Patent Number: 4,486,842
[45] Date of Patent: Dec. 4, 1984

[54] APPARATUS AND PROCEDURE FOR LOCATING THREE-DIMENSIONAL OBJECTS PACKED IN BULK FOR PURPOSES OF CONTROLLING A GRIPPING TERMINAL

[75] Inventor: Jean-Paul Hermann, Massy, France

[73] Assignee: Regie Nationale des Usines Renault, Boulogne-Billancourt, France

[21] Appl. No.: 347,080

[22] Filed: Feb. 9, 1982

[30] Foreign Application Priority Data

Feb. 12, 1981 [FR] France ................................ 81 02747

[51] Int. Cl.³ ............................................ G06F 15/46
[52] U.S. Cl. ................................... 364/513; 364/478;
    358/101; 358/903; 414/730
[58] Field of Search ............... 364/478, 479, 468, 469,
    364/513, 514, 516; 414/730, 909; 358/101, 107, 903

[56] References Cited

U.S. PATENT DOCUMENTS

| | | | |
|---|---|---|---|
| 3,804,270 | 4/1974 | Michaud et al. | 364/478 |
| 4,017,721 | 4/1977 | Michaud | 358/903 |
| 4,120,403 | 10/1978 | Stephanos | 364/478 |
| 4,146,924 | 3/1979 | Birk et al. | 364/513 |
| 4,188,544 | 2/1980 | Chasson | 358/107 |
| 4,254,433 | 3/1981 | Dewar, Jr. et al. | 358/101 |
| 4,305,130 | 12/1981 | Kelley et al. | 364/478 |
| 4,315,771 | 2/1982 | Bobillon | 358/107 |
| 4,318,081 | 3/1982 | Yoshida | 364/468 |
| 4,330,779 | 5/1982 | Wilensky et al. | 358/101 |
| 4,402,053 | 8/1983 | Kelley et al. | 364/513 |

FOREIGN PATENT DOCUMENTS 2018422A 10/1979 United Kingdom .

Primary Examiner—Joseph F. Ruggiero
Assistant Examiner—Gary V. Harkcom
Attorney, Agent, or Firm—Oblon, Fisher, Spivak, McClelland & Maier

[57] ABSTRACT

An apparatus and procedure for locating three-dimensional bulk-loaded objects for purposes of controlling a gripping terminal, including at least one optical projection system associated with drive mechanisms commanded by an interface connected to a central processing unit, and a light sensor such as a TV camera mounted plumb with the surface (horizontal, for example) receiving the bulk load and connected to the analysis and processing mechanisms of the central processing unit. The optical system emits a substantially planar light bundle which sweeps the surface of the bulk load under the control of the drive mechanisms to vary incrementally the angle $\theta$ made by the bundle with respect the aforementioned surface. The value of the angle, measured by a coder, is transmitted to the central processing unit which analyzes the image of the bundle trace sensed by the camera. The central processing unit selects the point whose value corresponds to a predetermined condition, such as the highest point on the surface of the bulk load. The invention finds application in automatic high-speed unloading by an industrial robot of a crate filled with three-dimensional objects loaded in bulk.

12 Claims, 7 Drawing Figures

APPARATUS AND PROCEDURE FOR LOCATING THREE-DIMENSIONAL OBJECTS PACKED IN BULK FOR PURPOSES OF CONTROLLING A GRIPPING TERMINAL

BACKGROUND OF THE INVENTION

1. Field of the Invention

This invention concerns an apparatus as well as a procedure for locating three-dimensional objects packed in bulk for purposes of controlling a gripping terminal.

2. Description of the Prior Art

High-speed automatic feeding of an assembly line with three-dimensional parts which are picked up in succession by a robot from a container in which they are packed in bulk and jumbled together is complicated by the problems of the robot in recognizing and grasping the bulk-packed parts one by one with a high rate of success.

The solutions proposed previously involve the use of complex devices generally supported by powerful computing devices.

It has therefore been suggested that a topological survey be carried out of the protruberant areas at the surface of a bulk load, using methods involving the analysis of stereoscopic views or by projecting a luminous grid and analyzing the trace thereof, also by a stereoscopic procedure, in order to reconstruct the relief of the surface of the bulk load.

These methods, however, have the drawback of requiring complicated computations and calling for equipment which is difficult to deploy in an industrial setting.

SUMMARY OF THE INVENTION

Accordingly, the objects of this invention are to provide a novel device which overcomes the above-mentioned drawbacks and which in particular, makes it possible to process the data on a real time basis using instrumentation which has become conventional, simple algorithms which may be rapidly executed, and equipment suited for industrial application.

These and other objects are achieved according to the invention by producing a new and improved apparatus for locating three-dimensional objects packed in bulk for purposes of controlling a gripping terminal, including at least one optical projection system associated with drive mechanisms commanded by an interface connected to a central processing unit, a light sensor such as a TV camera plumb with the surface, for example a horizontal surface, receiving the bulk load and connected to processing and analysis devices of the central processing unit, wherein the optical system provides a substantially planar light bundle which sweeps the surface of the bulk load thanks to drive mechanisms which cause the angle $\theta$ between the bundle and the aforesaid surface to vary, and the value of that angle, measured by a coder, is transmitted to the central processing unit, which analyzes the image of the trace of the light bundle sensed by the camera and has processing circuits which select the point(s) whose values correspond to predetermined conditions.

In accordance with a first embodiment of the invention, the camera sweep is carried out perpendicularly to the axis of rotation of the projection system, and, for each sweep line xi, the analysis devices note the ordinate yi with respect to a plane (usually horizontal) reference of its intersection with the image of the bundle trace, this for each value $[\theta j]$.

In a second embodiment of the invention, the camera sweep is parallel to the axis of rotation of the projection system and, for each value $\theta j$, the analysis devices note the ordinate yi of the first illuminated sweep line and the abscissa xi of the first illuminated point of the trace image, this with respect to a plane (usually horizontal) reference.

Yet another feature of the invention resides in the provision of processing devices which calculate the value (zi) of the points (xi, yi) on the basis of the $\theta j$ values transmitted by the angular coder.

The invention further includes a procedure for locating three-dimensional objects packed in bulk for purposes of controlling a gripping terminal using an apparatus including at least one optical system connected with drive mechanisms commanded by an interface connected to a central processing unit, a light sensor such as a television camera plumb with a reference surface, a horizontal surface for example, receiving the bulk load and connected to the processing and analysis devices of the central processing unit, including delivering by means of the optical system a plane light bundle at an angle $\theta$ with respect to the reference surface, causing the optical system to rotate so as to cause the bundle to sweep the surface of the bulk load, analyzing the light trace from the light bundle picked up by the camera, and by using processing mechanisms, selecting the point(s) of the bulk load whose values correspond to predetermined conditions.

Furthermore, the procedure according to the invention includes drawing up, with respect to a reference, the cartesian coordinates (xi, yi, zi) of the points on the surface of the bulk load, this on the basis of the angular values $\theta j$ and the coordinates (xi, yi) of the points of intersection of the sweep line and the first illuminated point of the image of the luminous trace picked up by the camera.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a schematic diagram of an embodiment for implementing the optical system of the apparatus of the invention.

DESCRIPTION OF THE PREFERRED EMBODIMENTS

Figure 1:
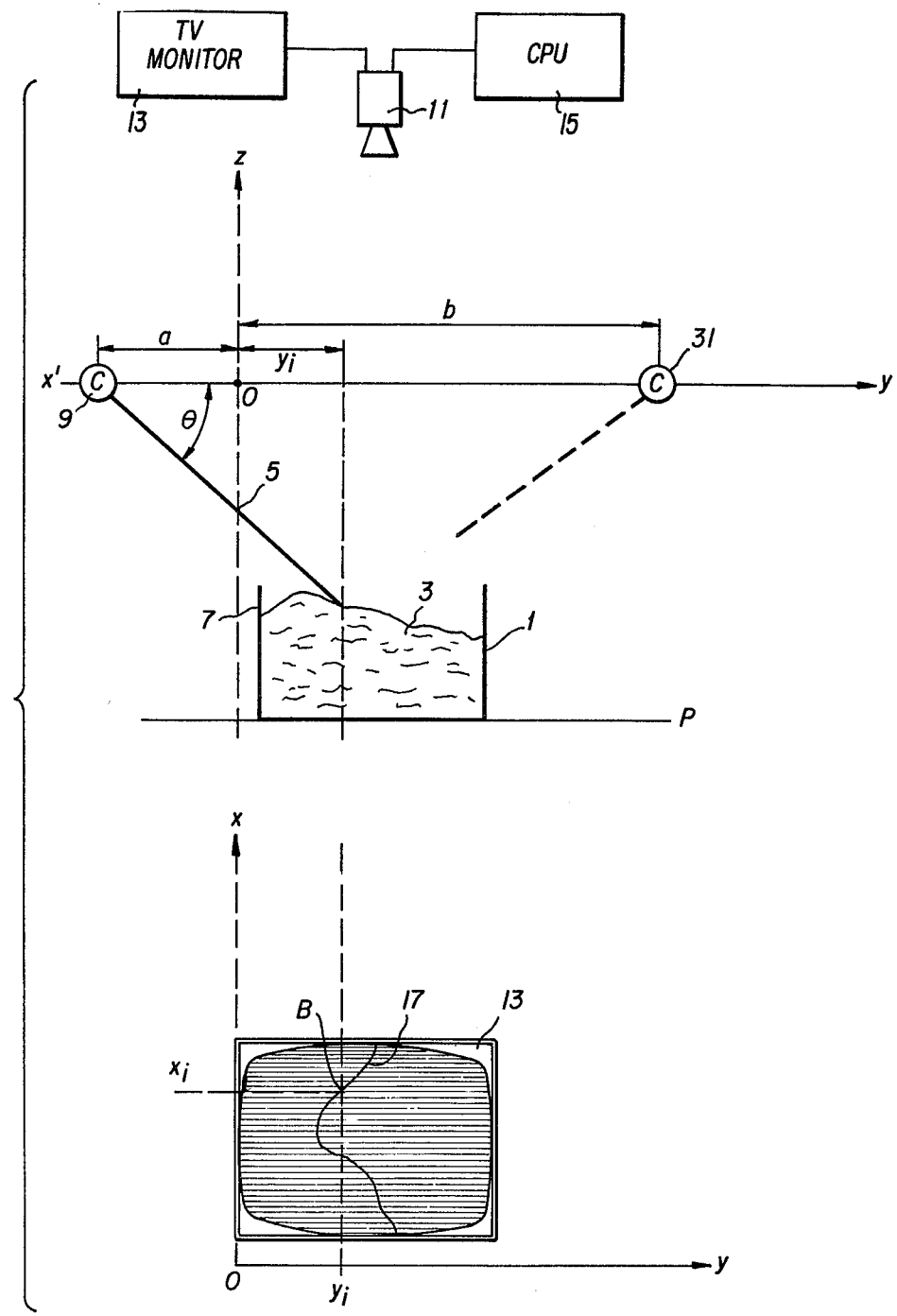
FIG. 1 is a schematic block diagram illustrating the geometry of the invention.

Referring now to the drawings, wherein like reference numerals designate identical or corresponding parts throughout the several views, and more particularly to FIG. 1 thereof, there is shown a basic block diagram illustrating the procedure according to the invention. As shown in FIG. 1 a crate 1 containing the three-dimensional bulkloaded parts 3 intended to be grasped by the gripping terminal of a robot is situated on a plane (e.g., horizontal) surface with trace P in such a way as to be swept is by a substantially planar light bundle 5. Light bundle 5 has a width which is sufficiently great to cover the side 7 adjacent to the bulk load. The bundle is provided with an optical projection system 9 placed above a certain distance to the left of the crate 1 along a longitudinal axis x' oriented, for greater simplicity, parallel to the side 7 and connected to a three-dimensional orthogonal reference with horizontal axis y parallel to the trace P and vertical axis z directed upwards.

A fixed television camera 11 is mounted plumb with the center of the bulk load at a height such that its field covers the complete surface of the bulk load and in such a way that pictures are not affected by parallax effects. The camera is connected on the one hand to a TV monitor 13 and, on the other hand, to a central processing unit 15 which consists principally of analysis and processing circuits.

With horizontal plane x'y, the plane light bundle 5 makes an angle $\theta$ which is made variable by rotating the projection system about its axis x'. The light bundle 5 produces a trace on the bulk load, which is an irregular curve because of the fact that the surface of the bulk load is not planar. The resultant is picked up by the television camera and is shown on the screen of the monitor in the form of an irregular curve 17, continuous or otherwise, which is analyzed in horizontal plane x'y, for example, in the following manner:

If the line sweep is carried out in direction y, for each sweep line $x_i$ note is taken of the ordinate $y_i$ with respect to a reference plane xy of the point of intersection B of the respective line $x_i$ and of the dark/light edge of the image of the trace, for which the coordinates with respect to xyz are $(x_i, y_i, z_i)$ where the figure $z_i$ is defined by the relationship $z_i = -(y_i + a) \cdot \tan \theta_j$. The origin of the ordinates coincides with the edge of the field of the TV camera and $(-a)$ is the ordinate of the light source.

By varying $\theta$, for each value $\theta_j$ it is possible to record the coordinates of points $(x_i, y_i, z_i)$, so as to retain after later processing with all these points only those points for which the $z_i$ values correspond to a predetermined condition, in particular, those for which the $z_i$ values are between two given figures H and (H−h), where H is generally the highest figure for the bulk load and h is a predetermined parameter; the points thus selected then constitute the image of the protruberant part of the bulk load.

The procedure according to the invention makes it possible to simplify considerably the image analysis by eliminating the objects situated at low points, which are generally of little interest anyway inasmuch as they are inaccessible to the gripping terminal of the robot.

Figure 2:
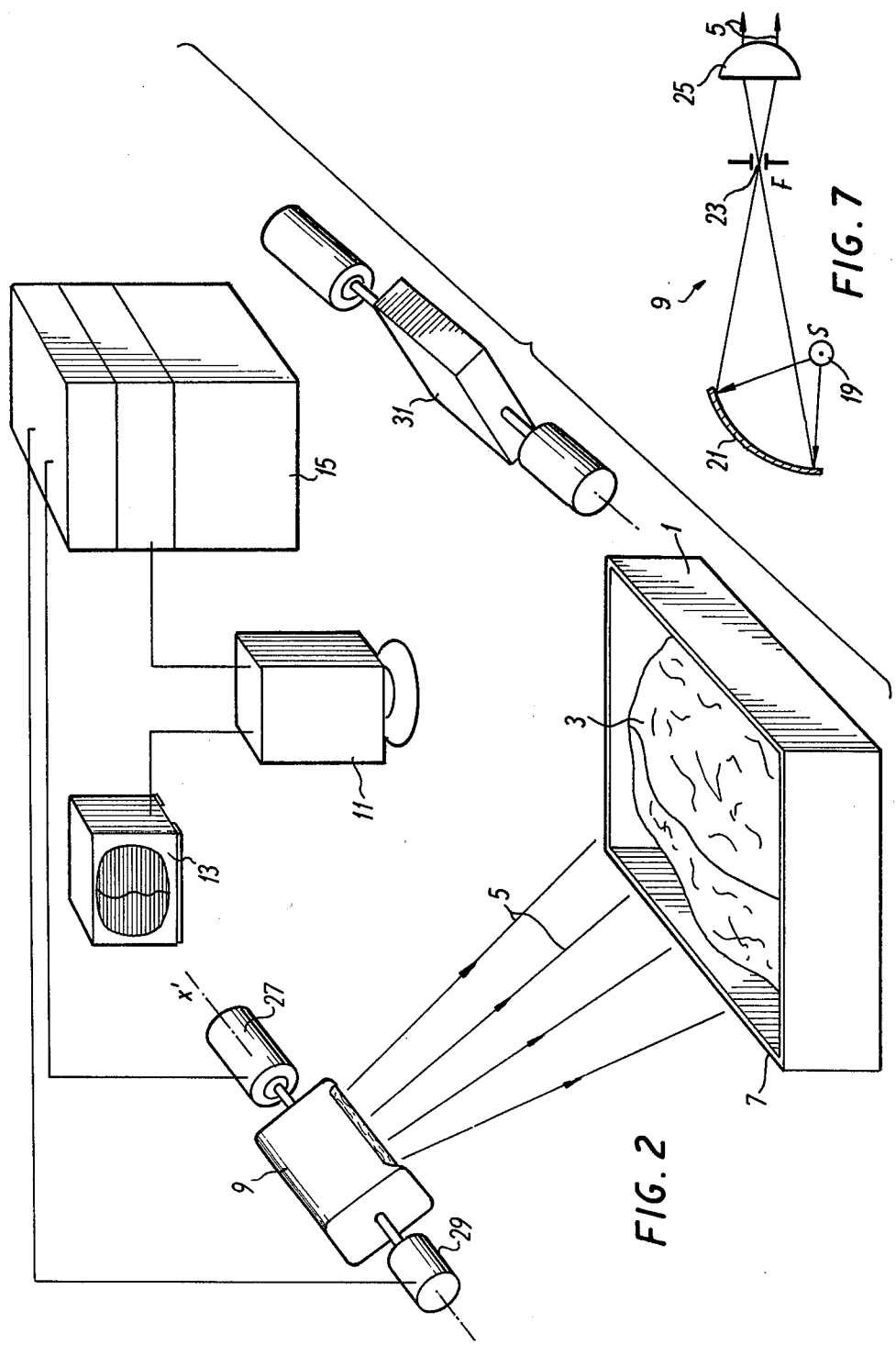
FIG. 2 is a block diagram of a locating device according to the invention.

FIGS. 2 and 7 schematically represent an apparatus whereby it is possible to implement the procedure according to the invention. In FIG. 2, there is shown the crate 1 of bulk loaded items above which is situated an optical projection system 9 for forming a planar light bundle 5. As shown in FIG. 7, optical projection system 9 includes a light source 19, for example a rectilinear filament incandescent lamp situated at or near the focal point S of a cylindrical elliptical mirror 21. Mirror 21 deines a focus point F at which is located an aperture 23. Light from the light source 19 is reflected off the mirror 21 and passed through the aperture 23 and to a lens 25. Lens 25 gives off a planar light bundle 5 whose width is substantially equal to that of the side 7 of the bulk load it sweeps; and providing substantially more illumination than ambient lighting, with the sweeping provided thanks to a drive motor 27 for rotating the projection system about axis x'. The foregoing, as well as an angular coder 29, is connected to command (interface) circuits tied into the central processing unit 15.

If the bulk load is contained in a crate with opaque walls, it is necessary to use a second optical system 31 on ordinate b, symmetrical to the first system with respect to the optical axis of the camera, with the two systems in turn each lighting half the surface of the bulk load and thereby overcoming any problems associated with shadows from the crate edges; in this case, figure $z_1$ is then given by the formula $z_i = -(b - y_i) \cdot \tan \theta_j$ with respect to the second system, which also has its own drive motor and angular coder, both of which are connected to the command (interface) circuits and hence to the central processing unit.

As described previously, the fixed television camera 11 is mounted plumb with the center of the bulk load at a height such that its field of view covers the complete surface of that load. The camera is connected on the one hand to the TV monitor 13 and, on the other hand, to the central processing unit, which inter alia contains electronic circuits for controlling the synchronization of the TV camera, the amplification and analog/digital conversion of the video signal, the validation of the measurements as a function of the motor command, and the listing of the values $x_i$, $y_i$ and $\theta_j$ as well as the processing mechanisms.

The command (interface) circuits induce the motor(s) to rotate the light bundle(s) between $\theta_1$ and $\theta_N$ about the axis from the light source, with a speed of rotation on the order of 5 degress per second so that the sweep would produce 250 images for an angular range of about 30 degrees, for the case where the image of the bulk load is within a square measuring 250×250 pixels.

For each value of $\theta_j$ ($\theta_1$, $\theta_N$), the device records the plane coordinates $(x_i, y_i)$ and calculates the value of $z_i = -(y_i + a) \cdot \tan \theta_j$ of the image points of the bundle trace; determination of the cartesian coordinates $(x_i, y_i, z_i)$ is followed by a processing phase which consists of retaining only those points for which $z_i$ corresponds to a predetermined condition.

Figure 4:
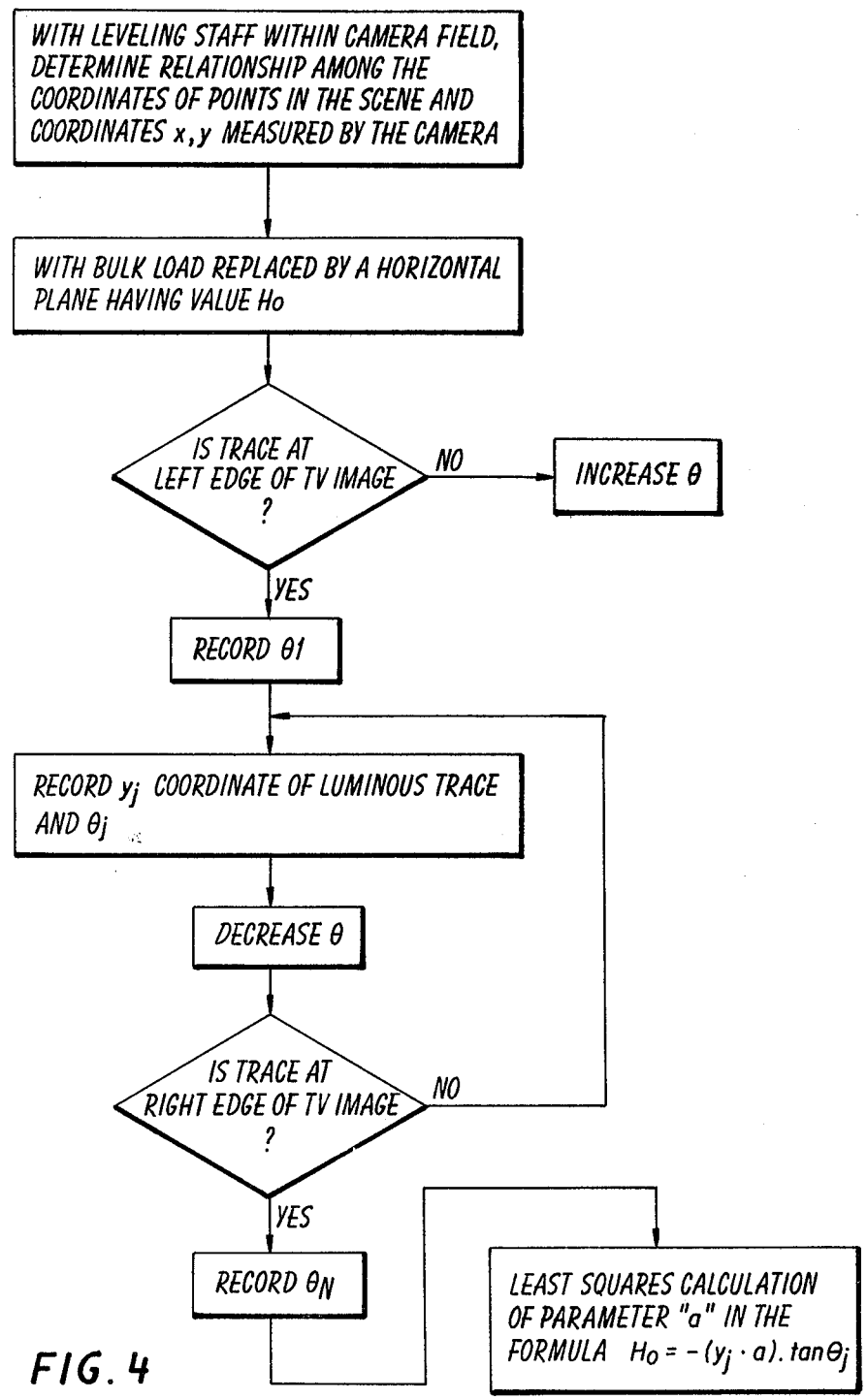
FIG. 4 is a flow chart of the sampling cycle of the apparatus of the invention.

The flow chart in FIG. 4 represents the sampling operation of the device by virtue of calculation of parameter "a" defined above, while the flow chart in FIG. 5 describes the image analysis operating cycle and the operating cycle for later processing so as to retain in memory only those points for which $z_i$ is located between two values H and (H−h).

To carry out the sampling, the bulk load is replaced by a horizontal plane at Ho, and after using a leveling staff to determine the relationship between the coordinates of the points within the scene in the field of the camera and the xy values are recorded for the different angular positions $\theta_j$ in the interval ($\theta_1$, $\theta_N$) so as subsequently to calculate the average value of "a" on the basis of a set of equations $H_o = -(y_j + a) \cdot \tan \theta_j$.

Figure 5:
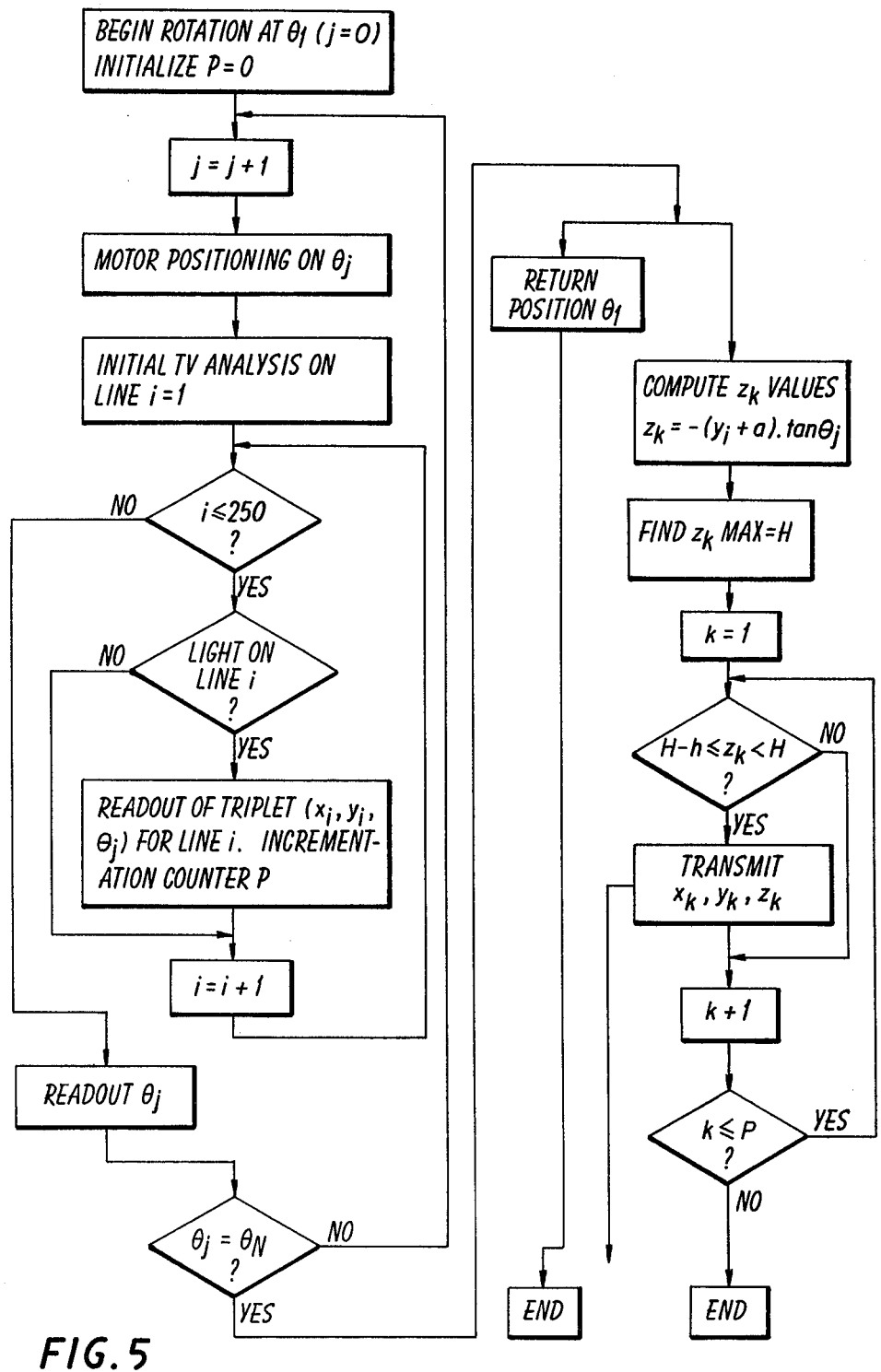
FIG. 5 is a flow chart of the operating cycle of the apparatus represented in FIG. 2.

The operating cycle represented in FIG. 5 begins at $\theta_1$ for $j = 0$ followed by issuing a command to the motor of the projection system positioning $\theta$ over $\theta_j$ for $j = j + 1$, following which TV analysis is initiated over 250 lines with the triplet $(x_i, y_i, \theta_j)$ being listed for each line for each value of $\theta$ between $\theta_1$ and $\theta_N$. The central processing unit then computes the $Z_k = -(y_i + a)\cdot\tan\theta_j$, finds the value of the highest point in the bulk load $Z_k$ Max = H, and then retains only those points whose values are situated in the interval between H and (H−h), where h is a predetermined parameter. In this flow chart, P designates the number of triplets (xyz) and K the current value of P.

In the event heights H and H−h are known in advance, as in the case of a semi-arranged bulk load, acquisition is simplified and is limited to the area defined by $$a - H/\tan\theta_j \leq Y \leq -a - (H-h)/\tan\theta_j.$$

This considerably simplifies the image analysis by eliminating the objects situated in the low spots, which are generally of little interest as they are out of reach of the robot's gripping terminal.

Analysis and processing of the image defined above, carried out using standard technical means, make it possible to determine the location and orientation of the objects situated at the surface of the bulk load for purposes of controlling the gripping terminal of an industrial robot designed to grasp them, and to do so at a high rate of speed.

The apparatus and the operational mode described above also make it possible to determine, for example with respect to reference ox yz, the coordinates $x_i, y_i, z_i$ of the highest point on the surface of the bulk load.

Figure 3:
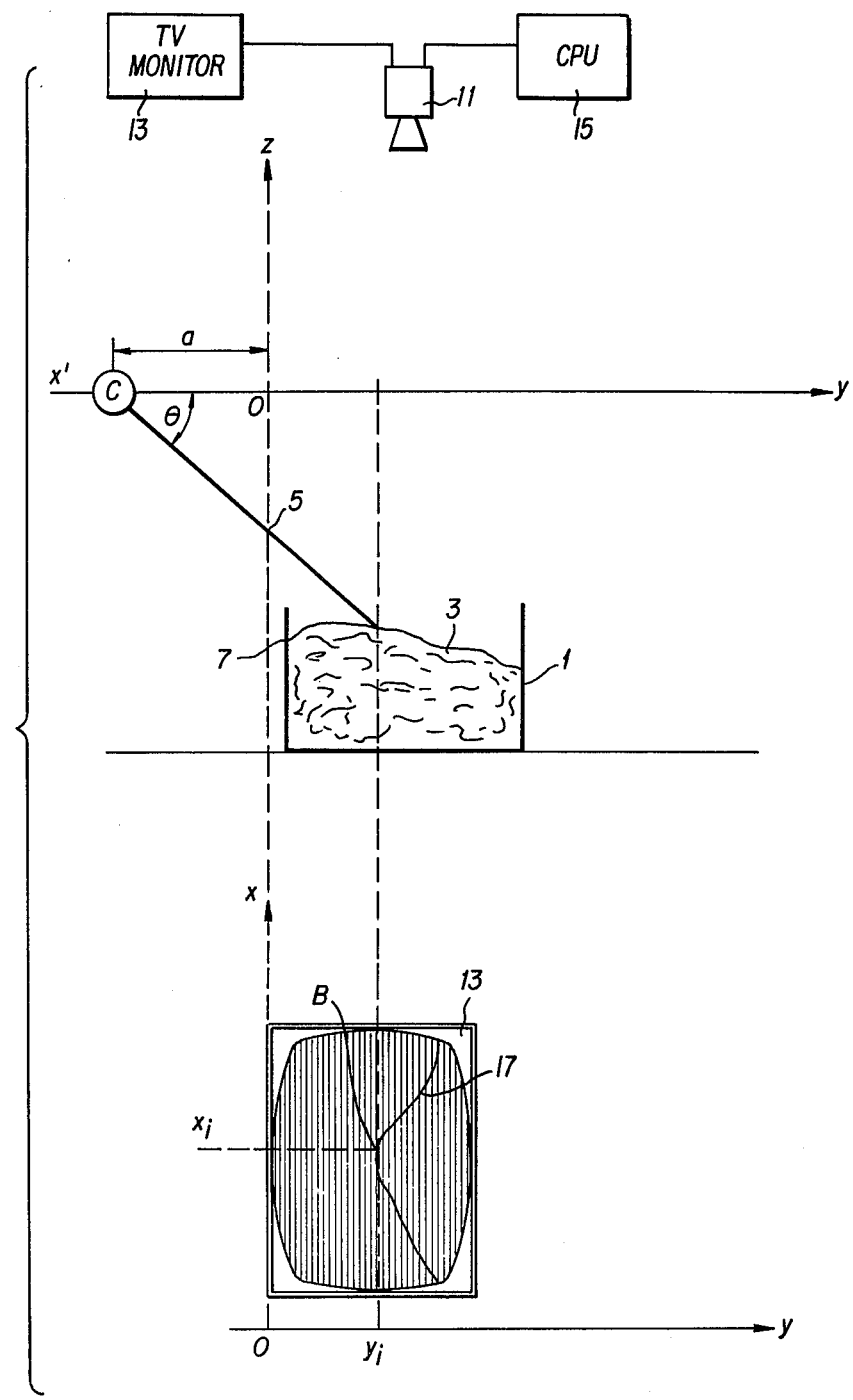
FIG. 3 is a schematic diagram of a second embodiment of the invention.
Figure 6:
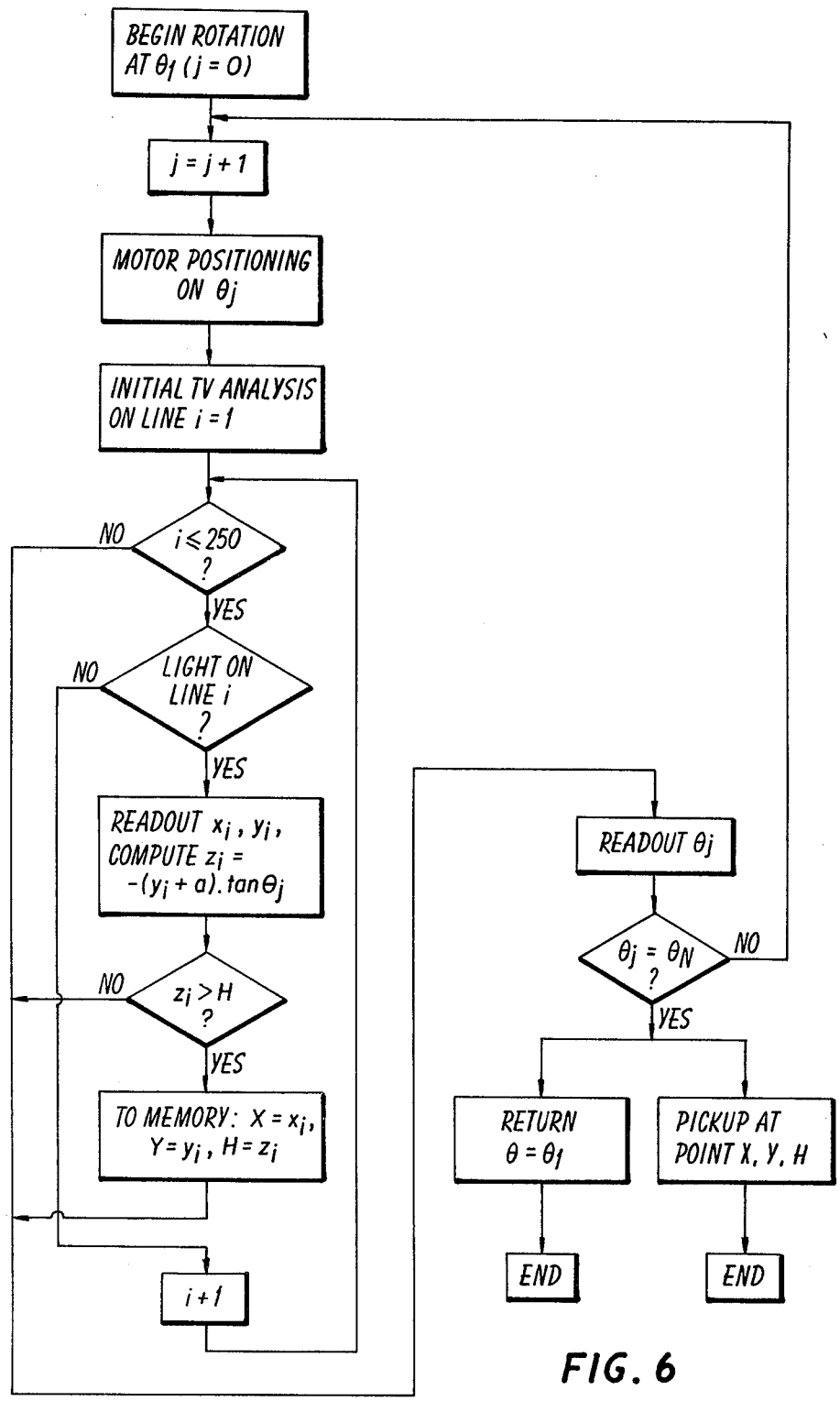
FIG. 6 is a flow chart of the operating cycle of the apparatus represented in FIG. 3.

However, this determination may be simplified by adopting the embodiment of the device represented in FIG. 3, in which the camera is turned 90 degrees so that the sweep lines are parallel to x. Indeed, supposing $y_i$ is the ordinate of the first line illuminated, when $\theta = \theta_j$, and $x_i$ the abscissa of the first point illuminated; and supposing the coordinates point $(x_i, y_i)$ is the highest of all those illuminated at that time and its value, computed according to the formula $z_i - a - (y_i + a)\cdot\tan\theta_j$, is compared to the highest figure previously encountered in the course of that sweep; if the value is higher, the triplet $(x_i, y_i, z_i)$ is entered in the memory and the previous triplet is erased. At this point, the following value of $\theta$ according to the operating cycle defined by the flow chart of FIG. 6 is checked, so that by the end of the processing of one sweep of the bundle between $\theta_1$ and $\theta_N$, it is possible to retain in the memory only the triplet XYH corresponding to the three coordinates of the highest point.

This FIG. 3 embodiment has the advantage of requiring only a very small storage memory, and its purpose is to identify the highest point in the bulk load for purposes of using a simple gripping terminal to grasp the corresponding area, in particular an electromagnet, grab or suction mechanism.

Of course, the means of implementing the procedure have been provided by way of nonrestrictive example only, and may be replaced by equivalent means; accordingly, the optical system described may be replaced by a laser beam. Moreover, the operating cycles defined by FIGS. 4, 5 and 6, readily understood by a specialist, have not been described in minute detail but nevertheless are an integral part of this description. Finally, $x_i, y_i, z_i$ may be calculated with respect to any other reference.

Obviously, numerous additional modifications and variations of the present invention are possible in light of the above teachings. It is therefore to be understood that within the scope of the appended claims, the invention may be praticed otherwise than as specifically described herein.

What is claimed as new and desired to be secured by Letters Patent of the United States is:

1. An apparatus for locating three-dimensional objects in a bulk load in order to control a gripping terminal for selective moving of said gripping terminal to at least one of said objects, comprising:
    at least one optical projection system for producing a substantially planar light bundle;
    drive means coupled to said optical projection system for sweeping said light bundle across a predetermined surface area of said bulk load, whereby an irregular light trace of said light bundle on said bulk load is produced;
    a central processing unit for controlling said drive means;
    light sensing means located plumb with a predetermined surface of said bulk load for sensing said irregular light trace from said light bundle reflected off said bulk load and for producing output signals indicative of said irregular light trace;
    said central processing unit comprising analysis and processing means coupled to the output signals of said light sensing means for processing said output signals;
    said drive means comprising means for rotating said light bundle through a predetermined angle $\theta$ in plural predetermined increments spanning the predetermined surface area of the bulk load;
    coder means for measuring the instantaneous value of said angle $\theta$ and for communicating said instantaneous value to said central processing unit; and
    said central processing unit comprising means for analyzing, for each value of the angle $\theta$, said irregular light trace sensed by said light sensing means and to define points $(x_i, y_i, z_i)$ indicative of a profile of said bulk load based on the irregular light trace for each said angle $\theta$, and means for selecting those of said defined points corresponding to a predetermined condition for controlling movement of the gripping terminal to the object located at the selected points based on the selected points.

2. An apparatus according to claim 1, wherein the light sensing means comprises a TV camera, comprising;
    means for controlling the camera to sweep perpendicularly to the axis of rotation of the projection system; and
    said analyzing means including means for recording, for each incremental angle of rotation and for each camera sweep line $x_i$, the ordinate $y_i$ with respect to a predetermined reference plane of an intersection between the sweep of the camera and said irregular light trace sensed by said camera, said analyzing means recording parameters $x_i$ and $y_i$ for each incremental value of angular rotation $\theta_j$.

3. An apparatus according to claim 1, wherein the light sensing means comprises a TV camera, comprising;
    means for controlling the camera to sweep parallel to the axis of rotation of the projection system; and
    said analyzing means comprising means for recording for each incremental angle of rotation $\theta_j$, the ordinate $y_i$ of the first illuminated sweep line and the abscissa $x_i$ of the first illuminated point of the image of the trace, wherein xi and yi are defined with respect to a predetermined reference plane.

4. An apparatus according to claims 2 or 3, wherein said predetermined reference plane includes the axis of rotation of the optical system, and an origin on said axis is defined by a predetermined edge of the area swept by said camera.

5. An apparatus according to claim 4 wherein said central processing unit comprises:
   means for computing a third-dimensional value zi for each point xi, yi based on the respective instantaneous angle $\theta j$ measured by said coder means.

6. An apparatus according to claims 1, 2 or 3, comprising:
   at least two optical projection systems arranged symmetrically with respect to said bulk load,
   said drive means and said coder means including a respective drive motor and angular coder, each coupled to said central processing unit, for sweeping respective of the optical projection systems and for measuring the respective instantaneous values of the respective angles $\theta j$.

7. An apparatus according to claim 5, comprising:
   means for controlling the gripping terminal of a robot based on the values of said coordinates (xi, yi, zi).

8. A procedure for locating three-dimensional objects in a bulk load in order to control a gripping terminal for selective moving of said gripping terminal to at least one of said objects, said procedure implemented by means of at least one optical projection system for producing a substantially planar light bundle, drive means commanded by an interface connected to a central processing unit for controlling the production of said light bundle, light sensing means mounted plumb with respect to a predetermined surface for receiving light from said light bundle reflected off said bulk load and for forming signals indicative of an image thereof, wherein said light sensing means is coupled to said central processing unit which processes the signals indicative of the reflected image, comprising:
   arranging the optical system to produce a light bundle making a predetermined initial angle $\theta$ with respect to said predetermined surface;
   rotating said at least one optical projection system so as to cause the angle $\theta$ to vary within a predetermined interval in predetermined increments $\theta j$ in order to sweep the surface of the bulk load thereby producing an irregular light trace of said light bundle for each increment $\theta j$;
   analyzing for each incremental value $\theta j$ the irregular light trace reflected off said bulk load and sensed by said light sensing means to define points indicative of a profile of said bulk load; and
   selecting predetermined points in the bulk load profile based on a predetermined condition as corresponding to the location of a three-dimensional object.

9. A procedure according to claim 8, wherein said analyzing step comprises:
   determining, with respect to a reference, the cartesian coordinates (x, y, z) of the defined points on the surface of the bulk load on the basis of the incremental angular values $\theta j$ and the respective coordinate (xi, yi) of the points of intersection between the sweep lines and the reflected irregular light trace sensed by said sensing means.

10. The procedure according to claim 8 or 9, wherein said selecting means comprising:
    selecting by means of said central processing unit those points of the bulk load which fall into a predetermined range defined by two predetermined values.

11. A procedure according to claim 8, wherein said analyzing step comprises:
    determining, with respect to a reference, the cartesian coordinates (xi, yi, zi) of the defined points on the surface of the bulk load on the basis of the incremental angular values $\theta j$ of the coordinates (xi, yi) of the point of intersection between a sweep line of said light sensing means and a first luminous point on the reflected irregular light trace sensed by said light sensing means.

12. A procedure according to claim 11, wherein said selecting step comprises:
    selecting by means of said central processing unit the highest point on the surface of the bulk load.

* * * * *